Feb. 13, 1951 H. E. BUECKEN ET AL 2,541,201
METHOD OF EXTRUSION
Filed Aug. 28, 1948 2 Sheets-Sheet 1

INVENTORS
EUGENE E. HESTON AND
BY HANS E. BUECKEN
Oberlin & Limbach
ATTORNEYS.

Feb. 13, 1951 H. E. BUECKEN ET AL 2,541,201
METHOD OF EXTRUSION
Filed Aug. 28, 1948 2 Sheets-Sheet 2

INVENTORS
EUGENE E. HESTON AND
BY HANS E. BUECKEN

Oberlin & Limbach
ATTORNEYS.

Patented Feb. 13, 1951

2,541,201

UNITED STATES PATENT OFFICE 2,541,201

METHOD OF EXTRUSION

Hans E. Buecken and Eugene E. Heston, Akron, Ohio, assignors to National Rubber Machinery Company, Akron, Ohio, a corporation of Ohio Application August 28, 1948, Serial No. 46,607

4 Claims. (Cl. 18—12)

The present invention relates as indicated to a method of extrusion, particularly continuous extrusion of plastic materials as accomplished for example by the well known screw type extrusion machines.

In the extrusion of plastic materials the uniform distribution of the temperatures along the extrusion cylinder is of considerable import, both from the standpoints of quality of the elongated article produced thereby, and of the efficiency of operation of the machine. For example, the frictional heat developed by the churning of the material to be extruded by the screw which is rotatable within the extrusion cylinder is often so great that even though the extrusion cylinder heating means is completely turned off the normal heat load (heating the plastic) plus the normal heat losses is insufficient to dissipate enough heat, hence temperature becomes uncontrollable. One manner of coping with this problem is to cut down the screw speeds, but, of course, this in turn results in a much reduced productivity of the machine.

Furthermore, close control of the several heating zones of progressively increasing temperature from the hopper end of the extrusion cylinder toward the extrusion orifice end thereof is required in order to first heat the outer layer of material spiraled about the extrusion screw to a "tacky" consistency whereby such material will adhere to the wall of the cylinder so that the extrusion screw may be rotated relative to such material to urge the material forward toward the extrusion orifice under required pressure and then to finally heat the material at the extrusion orifice end of the cylinder to completely plasticize the same.

It is also essential that means be provided for rapidly cooling the extrusion cylinder at the end of a run to thus protect the plastic material remaining therein from the high temperature of the cylinder. This eliminates the problem of clearing the machine after each run and also eliminates the danger to the operator from noxious gases and vapors emanating from the material which may be decomposed by such high temperature.

Accordingly, amongst the principal objects of this invention are to provide a novel method of closely and uniformly controlling the temperature of the extrusion cylinder along the heating zones mentioned above in such a manner that the difficulties heretofore experienced are avoided.

Other objects and advantages of the invention will become apparent as the following description proceeds.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
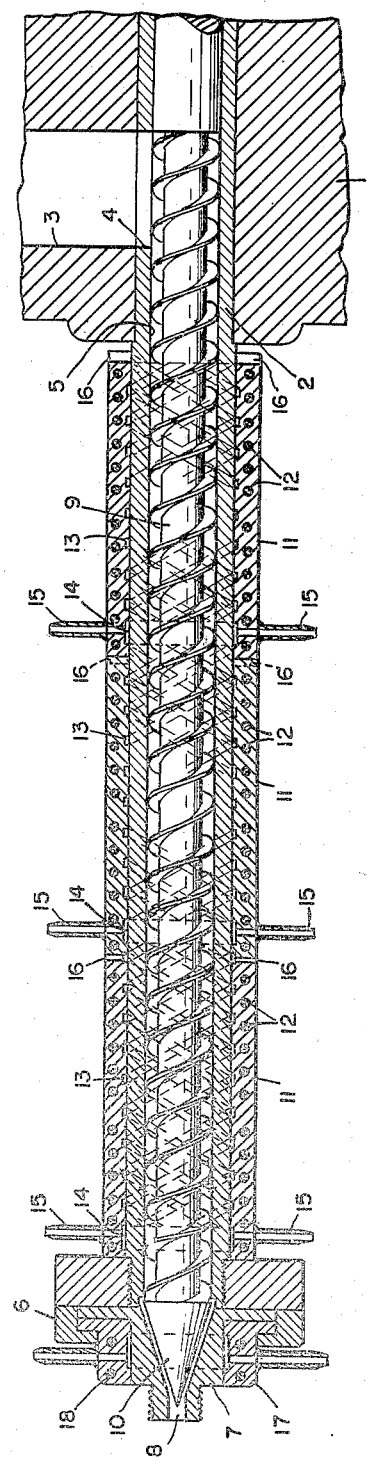
Fig. 1 is a central longitudinal cross section of the extrusion cylinder portion of a screw type extrusion apparatus.

The extrusion apparatus illustrated in Fig. 1 comprises a body 1 into which one end of an extrusion cylinder 2 is nonrotatably fitted, said body and cylinder being provided with registering openings 3 and 4, respectively, through which plastic material in granular, powdered, strip, or other convenient form is introduced from a suitable hopper, not shown, into the bore 5 through the cylinder. To the other end of cylinder 2 is fitted a die head 6 carrying therein an extrusion die 7 provided with an extrusion orifice 8 therethrough of desired cross section size and shape.

Rotatable within cylinder 2 is an extrusion screw 9 which, as is well known, functions when rotated within cylinder 2 to urge the plastic material introduced into the cylinder through openings 3 and 4 forward toward the extrusion orifice 8. The forward end of screw 9 is formed with a spreader head 10 which is operative to thinly spread the material to be extruded so that it is effectively worked and heated and thoroughly plasticized just prior to its eduction from extrusion orifice 8.

Surrounding cylinder 2 throughout substantially its entire length are several contiguous heating cylinders 11, each of which as shown preferably comprises a tubular body with an electric heating coil 12 embedded therein. The inner surface of each heating cylinder 11 is formed with double lead threads 13 which terminate adjacent one end of the cylinder in an annular inlet chamber 14. Said cylinder 11 is formed with two pairs of diametrically opposed openings 15 and 16 at opposite ends of the cylinder, said openings communicating with the spiral spaces defined between the outer surface of cylinder 2 and the threads 13 in the heating cylinder 11. As will be presently explained, a suitable temperature modifying medium such as air, for example, is adapted to be flowed through the inlet openings 15 and the aforesaid spiral spaces, such air being exhausted through the openings 16.

Surrounding the extrusion die 7 is a heating cylinder 17 which has an electric heating coil 18 therein, said cylinder 17 forming an annular passage around said die through which a suitable temperature modifying medium may be flowed.

Figure 2:
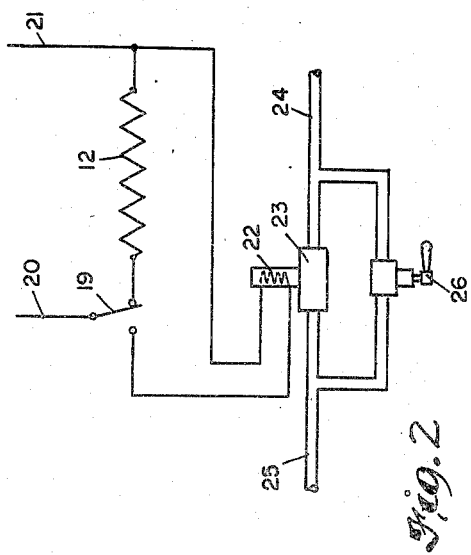
Fig. 2 is a schematic wiring and piping diagram of the temperature controlling means associated with each of the heating zones.

Associated with each heating cylinder 11 is a thermoswitch 19, see Fig. 2, which is adapted to maintain that portion of the extrusion cylinder 2 which said heating cylinder surrounds at a temperature within prescribed minimum and maximum limits. As diagrammatically illustrated in Fig. 2, the thermoswitch 19 will initially be in the position illustrated, with electric current from the power leads 20 and 21 flowing through the heating coil 12. When the temperature of the extrusion cylinder portion surrounded by the heating cylinder 11 attains a predetermined maximum temperature, said switch 19 will shift to the left, as viewed in Fig. 2, to open the circuit through the heating coil 12 and when the temperature of the extrusion cylinder attains a predetermined minimum temperature, said switch 19 will shift to the right to the position shown in Fig. 2 to close the circuit through the heating coil 12.

In a preferred arrangement the solenoid 22 and valve 23 operated thereby, as illustrated in Fig. 2, will be omitted and a continuous stream of temperature modifying medium such as air will be circulated through the spiral spaces defined between the heating cylinder 11 and the extrusion cylinder 2. The principal reason for so continuously circulating a temperature modifying medium is to provide for a very uniform dissipation of the heat conducted from the heating cylinder 11 to the extrusion cylinder 2. It has been found that uniform heating of an extrusion cylinder circumferentially thereabout by electric heating means is difficult of attainment as compared with jacketed extrusion cylinders through which a heating fluid such as steam or hot oil is circulated. However, with the preferred arrangement wherein a temperature modifying medium such as air is circulated through the spaces defined between the heating cylinder 11 and the extrusion cylinder 2, electric heating means may be employed and at the same time a uniform dissipation of uncontrollable heat is attained.

In the alternative arrangement as disclosed in Fig. 2, said thermoswitch 19 when it shifts toward the left will be operative to close the circuit through the solenoid 22 of the solenoid actuated valve 23.

The energization of solenoid 22, as aforesaid, unseats a valve element in valve 23, whereby air or other suitable coolant under pressure from conduit 24 flows through valve 23 and conduit 25, said conduit 25 having connection with the pair of inlet openings 15 associated with heating cylinder 11. The coolant will then flow through the spaces defined between the heating cylinder 11 and the extrusion cylinder 2 to thus effectively reduce the temperature of the latter cylinder. Upon reduction of the temperature to a predetermined minimum, the thermoswitch 19 will then shift to the position illustrated in Fig. 2 to thus open the circuit through the solenoid 22 permitting the valve member in valve 23 to engage its seat and to close the circuit through the heating coil 12. Connected in parallel with valve 23 is a by-pass valve 26 which may be manipulated at will to effect circulation of any desired amount of coolant through the spiral passages about the extrusion cylinder 2 even though heating coil 12 is energized.

It will be observed that circulation of the temperature modifying medium through the spaces between heating cylinder 11 and extrusion cylinder 2 effectively modifies the temperature of both of said cylinders. In the preferred and the alternative arrangements described above, constant heat regulation is obtained by providing a thermoswitch 19 which in the first case operates to cut off the heating means when the extrusion cylinder temperature reaches a predetermined maximum and which in the latter case additionally operates to energize the solenoid 22 and thus open the valve 23 to permit a temperature modifying medium to circulate between the heating means and the extrusion cylinder. In the first case, the temperature modifying medium is constantly circulated through the chamber between the heating cylinder and extrusion cylinder. Furthermore, in the last case, a very uniform distribution of the heat along such heating zone of the extrusion cylinder is accomplished by opening the by-pass valve 26 to effect a continuous flow of temperature modifying medium between the heating means and the extrusion cylinder.

Figure 3:
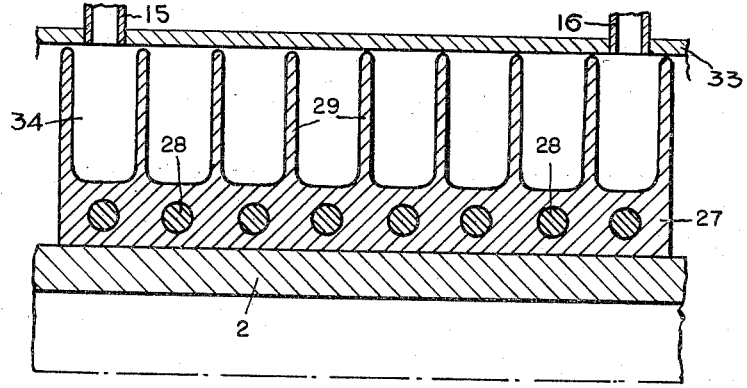
Figs. 3, 4, and 5 are diametrical cross-section views of modified forms of heating cylinders adapted to be positioned over extrusion cylinders or the like for controlling the temperature of the latter.

In the form of the invention illustrated in Fig. 3 the heating cylinder surrounding the extrusion cylinder 2 comprises a body 27 provided with a heating element 28 and with a radially projecting fin 29, said fin forming with the body 33 thereabout a heat exchange passage 34 through which a temperature modifying medium such as air, for example, may be flowed as from the conduit 25 in Fig. 2. Said fin 29 is operative not only to effect a uniform distribution of heat along the cylinder but as in the cylinder of Fig. 1 to effectuate a rapid cooling of the extrusion cylinder on the occasion of the machine being shut down or on the occasion of the extrusion cylinder attaining a predetermined maximum temperature.

Figure 4:
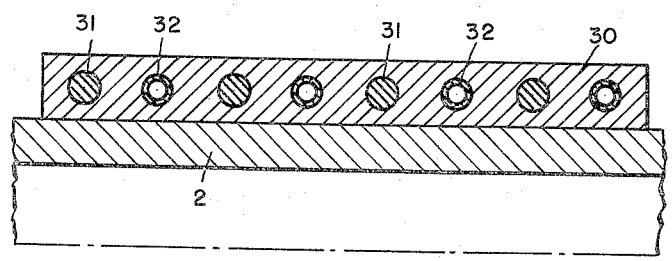

In Fig. 4 is illustrated a still different form of heating cylinder which comprises a tubular body 30 provided with a heating element 31 and with chambers 32 for circulation of coolant, said heating element and said chambers preferably being arranged spirally along the heating cylinder. The operation of the heating cylinder of Fig. 4 is preferably substantially the same as that of Fig. 1 and therefore such operation will not be repeated.

Figure 5:
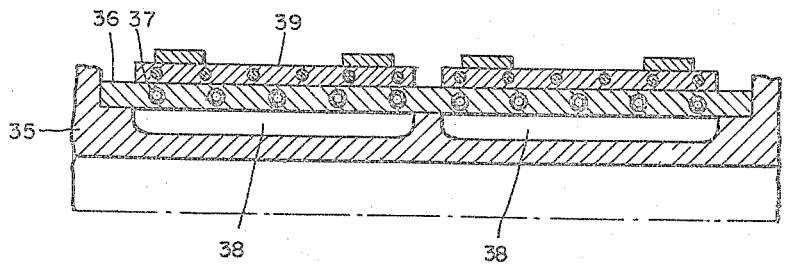

In the embodiment of the invention illustrated in Fig. 5, the extrusion cylinder 35 has fitted therearound a member 36 formed with passages 37 for the circulation of temperature modifying medium and forming with said cylinder other passages 38 for circulation of another temperature modifying medium, preferably air. Around member 36 is an electric or like heating cylinder 39. In this arrangement, the passages 38 may be separate to enable a more accurate temperature control along the cylinder 35 by circulating media at preselected temperatures through the respective passages. Likewise, the passages 37 may be arranged in groups axially along the cylinder for selective circulation of media at different predetermined temperatures therethrough. Another arrangement of the passages 37 which may be desirable in some instances is to have media at different temperatures selectively circulated through alternate passages, viz. one medium circulated through the first, third, fifth, etc. passages and another medium circulated through the second, fourth, sixth, etc. passages or a similar disposition involving three or more different media. Thus it is apparent that a precise temperature control and uniform heat dissipation may be attained. With these improvements a very wide latitude of adjustment may be rapidly effected to suit varied requirements in accordance with the properties of the particular material being extruded.

Although the several embodiments of the invention herein disclosed might most readily comprise cast heating cylinders with heating elements embedded therein, it will be understood that said cylinder assemblages may be otherwise fabricated. In any case, the present invention enables desired temperature control of an extrusion cylinder by the provision of a supplemental and immediate cooling action which, when the machine is in operation effects a dissipation of the excess extrusion cylinder heat caused by friction of the screw operating upon the material and uniform distribution thereof and when the machine is shut down, effects a rapid cooling of the extrusion cylinder whereby to avoid overheating of the then non-moving material in contact with the walls of the cylinder.

Other modes of applying the principle of the invention may be employed, change being made as regards the details described, provided the features stated in any of the following claims or the equivalent of such be employed.

We therefore particularly point out and distinctly claim as our invention:

1. In the method of extrusion in which a screw rotated within a heated extrusion cylinder is operative to cause heat plasticizable material which is fed to the cylinder to flow therethrough and to be plasticized during the course of its flow, such working of the material generating frictional heat, the steps of supplying heat to the cylinder, discontinuing such heating of the cylinder when the temperature thereof reaches a predetermined maximum, again supplying heat to the cylinder when the temperature thereof reaches a predetermined minimum, and continuously extracting heat from the cylinder at a rate which, when added to the rate of heat extraction by the material discharged from the cylinder and to the rate of heat loss of the cylinder, is not less than the rate of heat generation by mechanical working of the material by the screw.

2. In the method of extrusion in which a screw rotated within a heated extrusion cylinder is operative to cause heat plasticizable material which is fed to the cylinder to flow therethrough and to be plasticized during the course of its flow, such working of the material generating frictional heat, the steps of supplying heat to the cylinder, discontinuing such heating of the cylinder when the temperature thereof reaches a predetermined maximum, again supplying heat to the cylinder when the temperature thereof reaches a predetermined minimum, and continuously extracting heat from the cylinder at a rate which, when added to the rate of heat extraction by the material discharged from the cylinder and to the rate of heat loss of the cylinder, is not less than the rate of heat generation by mechanical working of the material by the screw, and at a rate to hold the temperature of the cylinder to at least a value insufficient to cause harmful overheating of the material upon stopping of the screw.

3. In the method of extrusion in which a screw rotated within a heated extrusion cylinder is operative to cause heat plasticizable material which is fed to the cylinder to flow therethrough and to be plasticized during the course of its flow, such working of the material generating frictional heat, the steps of supplying heat to the cylinder, discontinuing such heating of the cylinder when the temperature thereof reaches a predetermined maximum, again supplying heat to the cylinder when the temperature thereof reaches a predetermined minimum, and continuously extracting heat from the cylinder at a rate which, when added to the rate of heat extraction by the material discharged from the cylinder and to the rate of heat loss of the cylinder, is greater than the rate of heat generation by mechanical working of the material by the screw.

4. In the method of extrusion in which a screw rotated within an extrusion cylinder is operative to cause heat plasticizable material which is fed to the cylinder to flow therethrough and to be plasticized and worked during the course of its flow, such working of the material generating frictional heat, the steps of continuously carrying away from the cylinder by means of a cooling fluid an amount of heat which when added to the heat lost due to dissipation losses and heat contained in the material being continuously discharged will total an amount of heat not less than that generated by mechanical working of the material, and maintaining the desired temperature level in the cylinder by a controlled supply of heat.

HANS E. BUECKEN.
EUGENE E. HESTON.

REFERENCES CITED

The following references are of record in the file of this patent:

UNITED STATES PATENTS

| Number | Name | Date |
| --- | --- | --- |
| 1,902,295 | Shook | Mar. 21, 1933 |
| 2,296,295 | Shaw | Sept. 22, 1942 |
| 2,433,936 | Tornberg | Jan. 6, 1948 |
| 2,440,323 | Battista | Apr. 27, 1948 |